United States Patent [19]
Price

[11] 4,030,252
[45] June 21, 1977

[54] WORKPIECE TRANSPORTING STRUCTURE FOR USE WITH A CYLINDRICAL GRINDER

[75] Inventor: Ralph E. Price, Waynesboro, Pa.

[73] Assignee: Landis Tool Company, Waynesboro, Pa.

[22] Filed: June 3, 1976

[21] Appl. No.: 692,702

[52] U.S. Cl. .................. 51/215 R; 51/215 CP; 214/1 BB
[51] Int. Cl.² .................. B24B 41/00
[58] Field of Search ....... 51/215 R, 215 CP, 215 H, 51/215 UE; 82/2.5; 214/1 BC, 1 BD, 1 BB

[56] References Cited

UNITED STATES PATENTS

| 3,226,886 | 1/1966 | Seidel | 51/215 R |
| 3,601,927 | 8/1971 | Kikuchi | 51/215 R |
| 3,619,951 | 11/1971 | Kikuchi | 51/215 R |
| 3,640,026 | 2/1972 | Flanigan | 51/215 R |
| 3,655,070 | 4/1972 | Haydu | 214/1 BB |
| 3,754,667 | 8/1973 | Storch | 214/1 BB |
| 3,834,213 | 9/1974 | Henzler | 214/1 BB X |

*Primary Examiner*—Al Lawrence Smith
*Assistant Examiner*—Nicholas P. Godici

*Attorney, Agent, or Firm*—Spencer T. Smith

[57] ABSTRACT

A workpiece transporting structure for use with a cylindrical grinding machine having a workpiece clamping assembly, comprising means for delivering workpieces to the clamping assembly including a plurality of laterally spaced workpiece supports, lift and carry means for sequentially advancing supported workpieces to the forwardmost workpiece support, a loading arm having a workpiece holder displaceable from a first position to a second position whereat a held workpiece can be clamped by the clamping assembly, the holder, located at the first position, comprising the forwardmost workpiece support, and means for removing workpieces from the clamping means including a second plurality of laterally spaced workpiece supports, lift and carry means for sequentially advancing workpieces from the rearwardmost workpiece support of the removing means, and unloading arm having a workpiece holder displaceable from a first position to a second position whereat a workpiece clamped in the clamping assembly can be held, the unloading arm holder, located at the first position, comprising the rearwardmost workpiece support.

1 Claim, 7 Drawing Figures

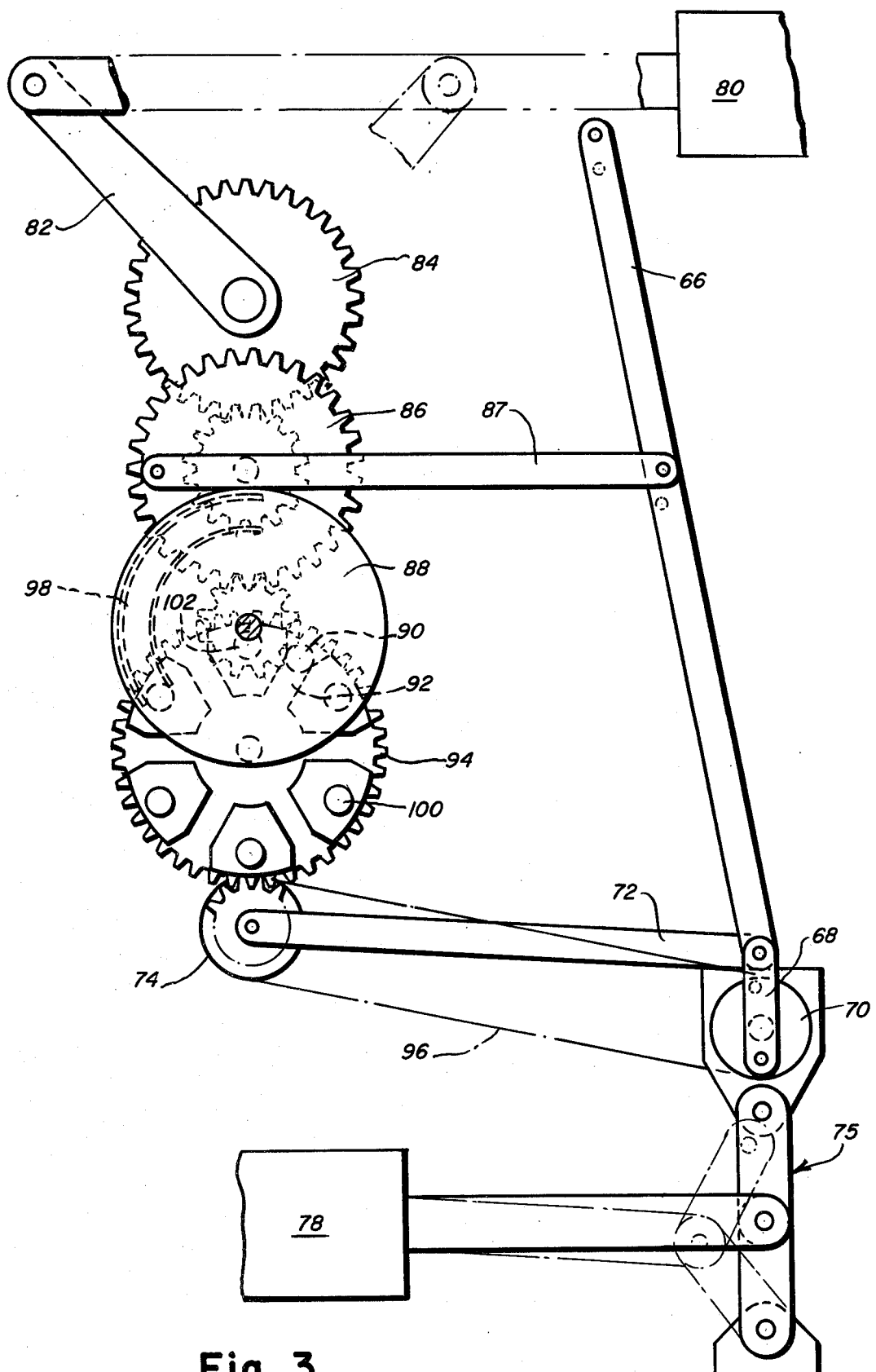
Fig_3

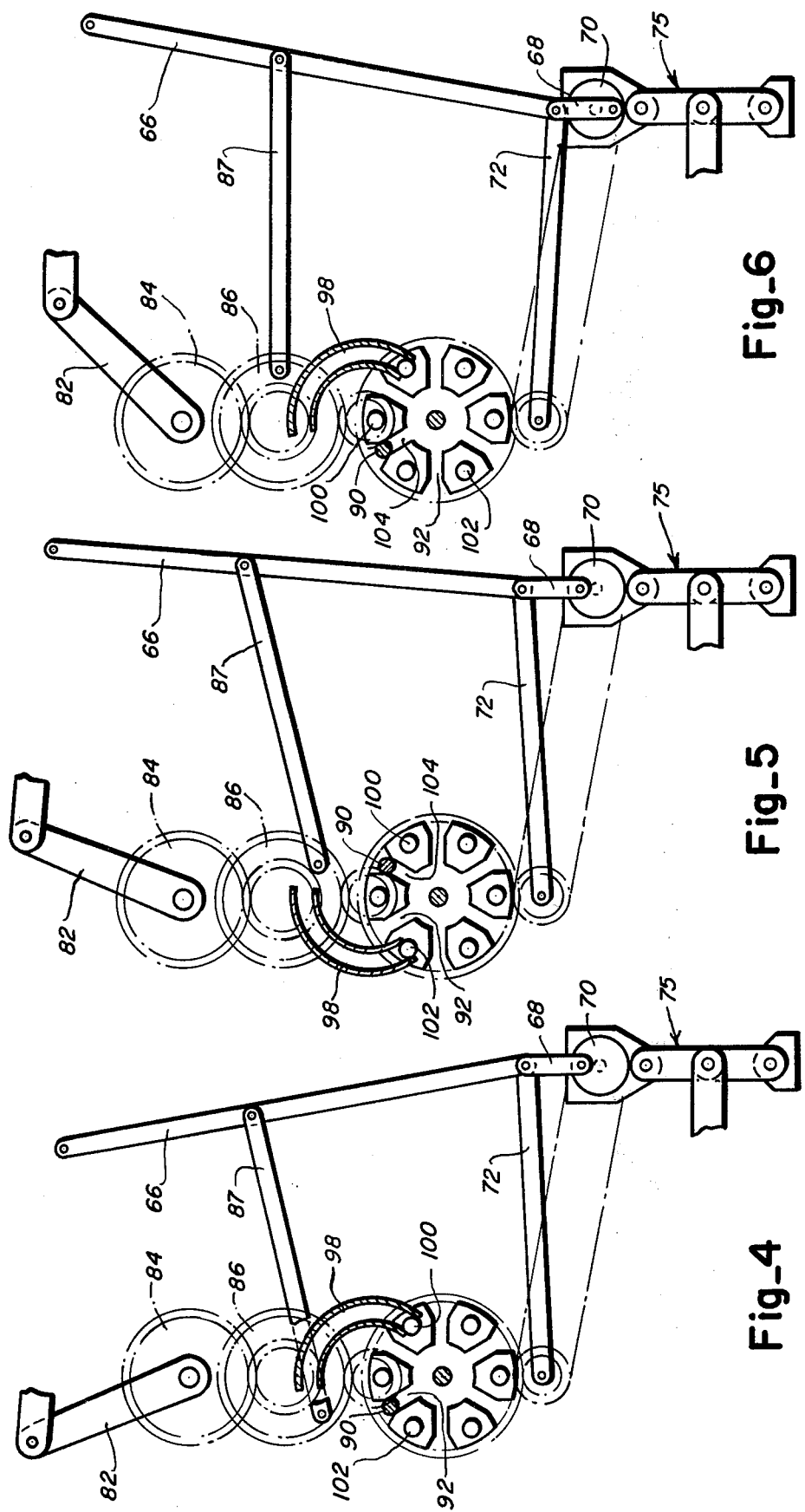

WORKPIECE TRANSPORTING STRUCTURE FOR USE WITH A CYLINDRICAL GRINDER

The present invention relates to cylindrical grinding machines and more specifically, to structures associated with cylindrical grinding machines for transporting workpieces to and removing them from the clamping assembly of the cylindrical grinding machine.

Conventionally, conveyor mechanisms have been utilized in conjunction with gantry loaders or other loader assemblies to deliver unground workpieces to and remove ground workpieces from a cylindrical grinding mechanism. Such conveyor mechanisms generally have a plurality of laterally spaced workpiece supporting positions with the workpiece being removed from or returned to the conveyor by the loader at specific workpiece supporting positions. The loading rams of such loader assemblies, to preclude interference with the operation of the conveyor, must be retracted to a location remote from the conveyor. These rams therefore must be displaced to an advanced location to engage the workpiece which is to be loaded into the cylindrical grinding machine and then selectively displaced to locate the workpiece with the clamping assembly of the cylindrical grinding machine. This constitutes an unduly complex and time consuming arrangement.

It is accordingly an object of the present invention to provide a structure for transporting workpieces to a cylindrical grinding machine wherein a workpiece can be removed from a conveyor and displaced to the clamping assembly simply by displacing a loading arm from a retracted position to an advanced position.

Other objects and advantages of the present invention will become apparent from the following portion of this specification and from the accompanying drawings which illustrate in accordance with the mandate of the patent statutes the presently preferred embodiment incorporating the principles of the invention.

Referring to the drawings:

FIG. 3 is an elevational view of the mechanism for controlling the displacement of the lift and carry rails illustrated in FIG. 1, at the start position;

FIGS. 4, 5 and 6, are simplified illustrations of the mechanism illustrated in FIG. 3 at three subsequent positions.

Figure 1:
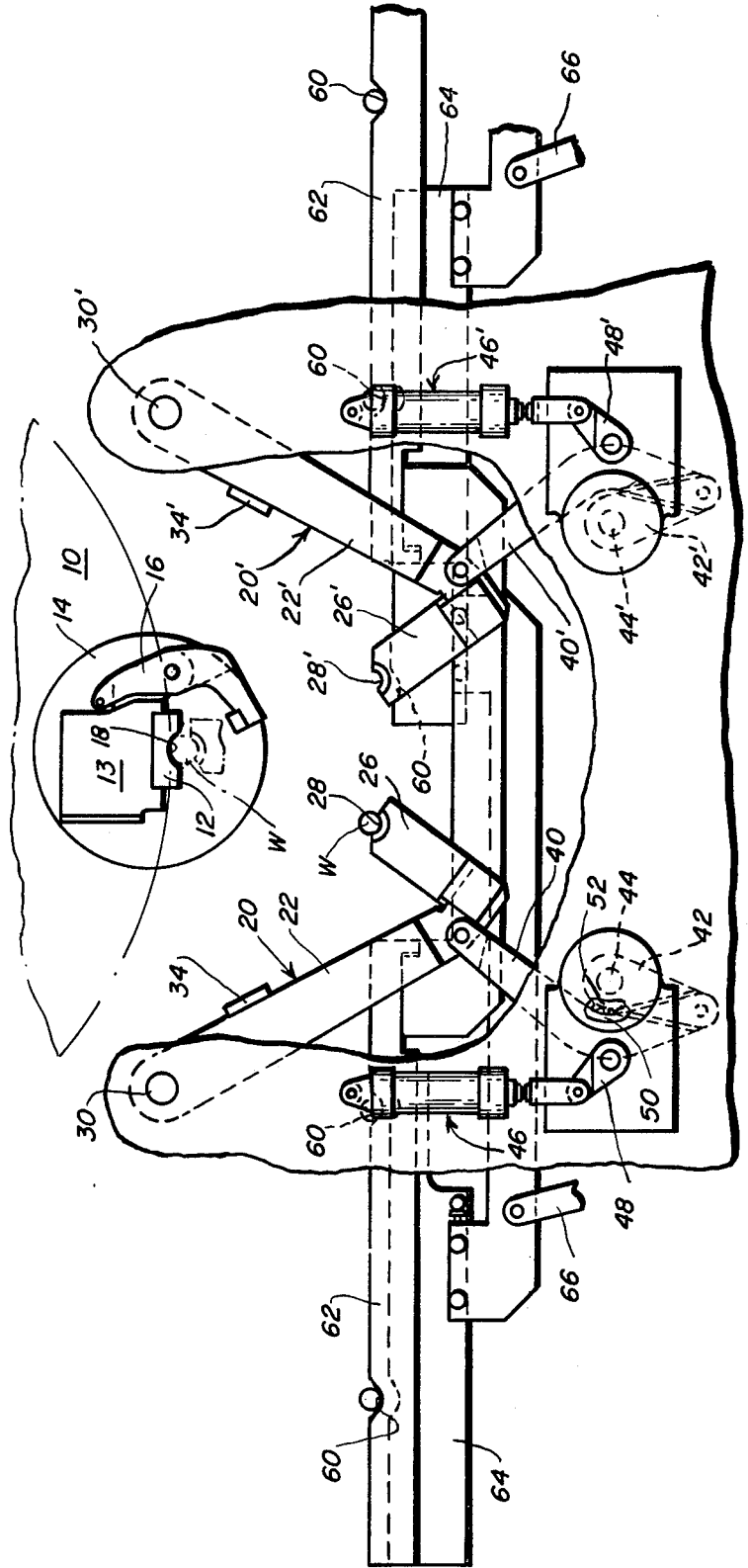
FIG. 1 is an elevational view of a workpiece transporting structure for use with a cylindrical grinding machine.

The cylindrical grinder illustrated in FIG. 1, includes a grinding wheel assembly having a single rotatable grinding wheel 10 which may be selectively downwardly advanced into abrasive engagement with a selected portion of a workpiece W such as a crankshaft. The workpiece is clamped between at least one throwblock 12, which is supported by a base member 13 integrally secured to the drive plate 14 of a rotatable workhead, and an associated jaw member 16 which is pivotally secured to the base member 13.

Figure 2:
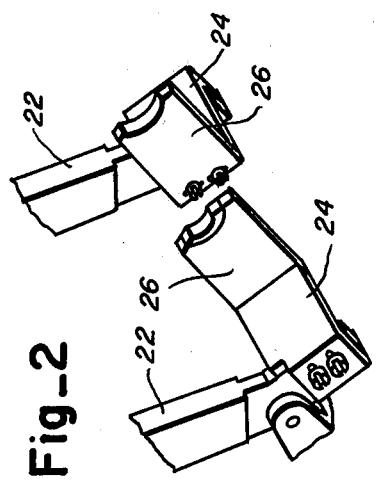
FIG. 2 is an oblique view of a portion of the transporting structure illustrated in FIG. 1.

The throwblock 12 includes a cylindrical workpiece receiving bearing surface 18. The configuration and direction of displacement of the jaw member are selected so that the jaw member, when clamping a workpiece in the throwblock will urge the workpiece substantially vertically upward (FIG. 2).

The loader assembly includes a pair of loading arms 20, each of which (FIG. 2) has a side member 22, an inwardly extending base member 24, and an upwardly extending work support member 26. The bearing surface portions 28 of the work support members 26 support two spaced portions of the workpiece W. The side members 22 are pivotally mounted on a shaft 30 secured to opposing side walls 32 of the loader assembly and are joined by a cross member 34 so that the loading arms will be movable as a unit. The side members 22 are sufficiently spaced to permit lateral displacement of a workpiece therebetween.

A pair of lift or bell cranks 40 are pivotally connected to and extend between the bottom portion of the side members 22 and a pair of driven link 42, which are fixedly secured to a second shaft 44 extending between the side walls 30 of the loader assembly.

The loading arm work support members 26 are advanceable from a retracted position illustrated in FIG. 1 to an advanced position, illustrated in broken lines, by means of a hydraulic cylinder 46, which is pivotally mounted at one end to one of the side walls and at the other end to a drive link 48 fixedly secured to a drive gear 50. The advancement of the hydraulic cylinder from its retracted to its advanced position will accordingly rotate the drive link 48 and associated drive gear 50 thereby driving a driven gear 52 and the driven links 42 which are secured to the second shaft 44 to displace the work support from its retracted to its advanced position.

The structure of the unloading arms 20' and the mechanism for advancing the work support members 26' thereof from a retracted position illustrated in FIG. 2 to an advanced position (a mirror reversal of the loading arm work support illustrated in FIG. 2) are similar to the structure of the loading arms 20 and its advancing mechanism.

By selectively locating the second shaft 44, and the pivotal connections of the lift cranks 40 to define a substantially straight line at the retracted and advanced work support positions, a workpiece being loaded into the clamping assembly will be gently displaced from the retracted position, subjected to progressive acceleration and deceleration and gently deposited within the throwblock. Similarly, a workpiece being unloaded from the clamping assembly will be gently removed from the throwblock, subjected to progressive acceleration and deceleration and gently brought to rest at the retracted position.

Workpieces may accordingly be supported by the work support members of the loading and unloading arms without the necessity of locking the supported workpieces in the work supports.

Workpieces may be supported by the illustrated work transporting structure at six laterally-spaced locations. The two locations, at either end of the work transporting structure, are defined by transversely aligned cutouts or notches 60 established in a pair of spaced fixed rails 62. The remaining two locations are defined by the workpiece supporting surfaces 28, 28' of the retracted loader and unloader arms. The four pairs of cutouts support workpieces at the same elevation as the elevation of workpieces supported by the retracted loader and unloader arms.

At the conclusion of a grinding operation, with a workpiece clamped by the clamping assembly, workpieces will be supported at every location except at the unloader arm location. The empty unloader arm will advance to engage the ground workpiece and will remove the ground workpiece by retracting to the retracted position after the clamp jaw is released. The next workpiece, supported by the loader arm, will then be loaded into the clamping assembly whereupon the empty loader arm will be retracted to its retracted position.

Workpieces will be sequentially laterally advanced to the loader arm and sequentially laterally advanced from the unloader arm by a pair of spaced lift and carry rails 64 which are supported by a plurality of selectively displaceable lift and carry arms 66. The base of a lift and carry arm 66 is pivotally secured to one end of an elevating link 68 (FIGS. 3, 4, 5 and 6), which is eccentrically, pivotally secured at the other end to a first pulley 70. To maintain the elevating link in a substantially vertical orientation, the one end is pivotally secured to a stabilizing bar 72 which extends from the shaft of a second pulley 74. A toggle link 75, which is pivotally secured to the first pulley housing 76, is selectively displaceable by a cylinder 78 or the like, between a make position and a break position illustrated in broken lines in FIG. 3

Figure 7:
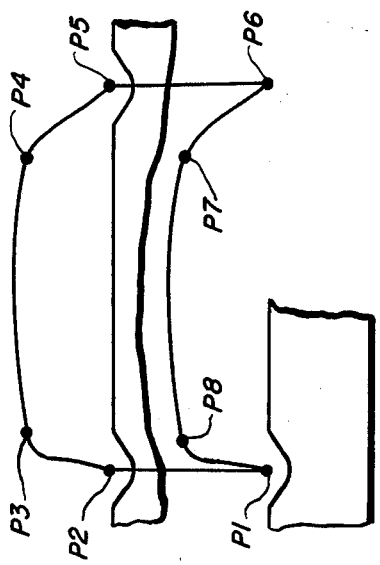
FIG. 7 is a graphical representation of the path of travel of the lift and carry rails of the lift and carry mechanism illustrated in FIG. 1.

FIG. 7 is a graphic representation of the path of displacement of the lift and carry rails as controlled by the displacement of the lift and carry arms. As the toggle link is displaced from the brake position to the make position (FIG. 3), the lift and carry rails are elevated from point P1 to point P2.

To advance the lift and carry rails from point P2 to point P3, a second cylinder 80 (FIG. 3) is displaced to rotate a drive link 82 and associated drive gear 84 through an angle of 22.5°. Such rotation effects a 45° rotation of a carry gear 86 which displaces a carry link 87 which is pivotally connected at one end to the lift and carry arm 66 and eccentrically connected at the other end to the carry gear 86, and a 120° rotation of a geared control disc 88 which is driven by the carry gear. Throughout this rotation of the control disc 88, a control disc pin 90, which is located within a first slot 92 in a geared controlled disc 94, effects a 60° rotation of the controlled disc 94 and a 180° rotation of the second geared pulley 74, which via a timing belt 96 rotates the first pulley 180° (FIG. 4). The lift and carry rails will be displaced along an arcurate path from point P3 to point P4 as the drive link 82 is further rotated through an angle of 45°. Throughout this rotation, a channel 98 secured to the control disc 88 which extends circumferentially 120°, engages first and second controlled disc pins 100, 102 thereby preventing the rotation of the controlled disc (FIG. 5).

To advance the lift and carry rails from point P4 to point P5, the drive link 82 is further rotated through an angle of 22.5°. The controlled disc 94 is released during this rotation so that the control disc pin 90 can engage within a second controlled disc slot 104 to rotate the controlled disc through a 60° angle to thereby lower the elevating link 68. A workpiece has thereby been lifted from one location and carried to and deposited at the next lateral location.

The lift and carry rails may then be returned to point P1 by breaking the toggle (point P6) and retracting the cylinder in successive 22.5° (point 7), 45° (point 8), and 22.5° (point 1) increments.

What is claimed is:
1. A workpiece transporting structure for use with a cylindrical grinding machine having a workpiece clamping assembly comprising
   means for delivering workpieces to the clamping assembly including
      a plurality of laterally spaced workpiece support means,
      lift and carry means for sequentially advancing supported workpieces to the forwardmost workpiece support means,
      loading arm means having workpiece holding means and means for displacing said workpiece holding means from a first position to a second position whereat a held workpiece can be clamped by the clamping assembly,
      said holding means, located at said first position, comprising said forwardmost workpiece support means, and
   means for removing workpieces from the clamping assembly including
      a second plurality of laterally spaced workpiece support means,
      lift and carry means for sequentially advancing workpieces from the rearwardmost workpiece support means of said removing means,
      unloading arm means having workpiece holding means and means for displacing said holding means from a first position to a second position whereat a workpiece clamped in the clamping assembly can be held,
      said unloading means holding means located at said first position, comprising said rearwardmost workpiece support means.

* * * * *